United States Patent
Black et al.

(10) Patent No.: US 7,515,974 B2
(45) Date of Patent: Apr. 7, 2009

(54) CONTROL SYSTEM AND METHOD FOR COMPLIANT CONTROL OF MISSION FUNCTIONS

(75) Inventors: Randall H. Black, Glendale, AZ (US); Andrew J. Michalicek, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 263 days.

(21) Appl. No.: 11/359,159

(22) Filed: Feb. 21, 2006

(65) Prior Publication Data

US 2007/0198126 A1   Aug. 23, 2007

(51) Int. Cl.
*G05B 13/02* (2006.01)
*G05B 9/02* (2006.01)

(52) U.S. Cl. .......................................... 700/28; 700/79
(58) Field of Classification Search ................. 700/28, 700/32–34, 79, 81, 97, 103, 104; 705/1, 705/4, 7–10, 35, 52–54; 706/45, 47, 903–918, 706/933
See application file for complete search history.

(56) References Cited

U.S. PATENT DOCUMENTS

| | | | | |
|---|---|---|---|---|
| 5,134,560 A * | 7/1992 | Ferriter et al. | ................. | 700/83 |
| 6,122,572 A | 9/2000 | Yavnai | | |
| 6,163,732 A * | 12/2000 | Petke et al. | ................. | 700/106 |
| 6,453,209 B1 * | 9/2002 | Hill et al. | ....................... | 700/95 |
| 6,760,712 B1 * | 7/2004 | Bonissone et al. | ............. | 706/4 |
| 6,792,363 B1 | 9/2004 | Bye | | |
| 6,912,502 B1 * | 6/2005 | Buddle et al. | ................... | 705/1 |
| 7,236,840 B2 * | 6/2007 | Uchida | ......................... | 700/97 |
| 2002/0099586 A1 * | 7/2002 | Bladen et al. | ................... | 705/7 |
| 2002/0194014 A1 * | 12/2002 | Starnes et al. | ................... | 705/1 |
| 2003/0014176 A1 * | 1/2003 | Levine | ......................... | 701/70 |
| 2003/0069894 A1 * | 4/2003 | Cotter et al. | ............. | 707/104.1 |
| 2003/0109281 A1 * | 6/2003 | Knoblach et al. | ........... | 455/556 |
| 2003/0217036 A1 * | 11/2003 | Haunschild et al. | ............ | 707/1 |
| 2004/0079557 A1 * | 4/2004 | Saxon et al. | ................. | 177/136 |
| 2004/0088245 A1 * | 5/2004 | Narayan et al. | ................ | 705/38 |
| 2004/0139053 A1 * | 7/2004 | Haunschild | .................... | 707/1 |
| 2004/0216039 A1 * | 10/2004 | Lane et al. | .................... | 715/511 |
| 2004/0267412 A1 | 12/2004 | Arnouse | | |
| 2005/0055330 A1 * | 3/2005 | Britton et al. | ................... | 707/1 |

(Continued)

OTHER PUBLICATIONS

PCT International Search Report, PCT/US2007/062420 dated Jun. 6, 2007.

*Primary Examiner*—M. N. Von Buhr
(74) *Attorney, Agent, or Firm*—Ingrassia Fisher & Lorenz, P.C.

(57) ABSTRACT

Systems and methods are provided for controlling one or more actuators to perform a mission while complying with predetermined regulations. A system for controlling one or more actuators includes a first processor for transmitting a command to operate at least one of the actuators, a second processor having an input coupled to the first processor, and a third processor having an input coupled to the output of the second processor and an output configured to couple to the actuators. The second processor is configured to transmit a first signal based on the command, and the first signal indicates a compliant command. The third processor is configured to transmit a second signal based on the first signal, and the second signal indicates a safe command. Software partitions executing on a single processor may be substituted for the hardware processors.

20 Claims, 2 Drawing Sheets

U.S. PATENT DOCUMENTS

| | | | |
|---|---|---|---|
| 2005/0071185 A1* | 3/2005 | Thompson | 705/1 |
| 2005/0197789 A1* | 9/2005 | Niermann et al. | 702/23 |
| 2005/0251573 A1* | 11/2005 | Merkow et al. | 709/226 |
| 2006/0095195 A1* | 5/2006 | Nishimura et al. | 701/96 |
| 2006/0129450 A1* | 6/2006 | Zarrow | 705/11 |
| 2006/0200008 A1* | 9/2006 | Moore-Ede | 600/300 |
| 2006/0253240 A1* | 11/2006 | Rao et al. | 701/48 |

\* cited by examiner

CONTROL SYSTEM AND METHOD FOR COMPLIANT CONTROL OF MISSION FUNCTIONS

FIELD OF THE INVENTION

The present invention generally relates to control systems, and more particularly relates to methods and systems implementing mission functions in compliance with predetermined regulations and standards.

BACKGROUND OF THE INVENTION

Autonomous systems (e.g., systems having some degree of self-operation) are particularly convenient for simplifying or minimizing labor intensive operations. High reliability systems, such as robotic systems, typically require a significant amount of human interaction for proper operation, and reducing the human interaction in such systems is desirable to conserve labor resources or more efficiently use labor resources, for example. To decrease the number of human operators associated with the robotic system, a certain amount of autonomy may be granted to the system for self-operation. However, autonomous systems generally implement non-deterministic processes which inherently have some unpredictability. By increasing autonomy, an absolute determination of what the system may do next becomes increasingly difficult if not impossible.

Some control systems are used in programs or vehicles regulated by one or more entities, for example aircraft regulated by the Federal Aviation Administration (FAA). In these control systems, the benefit of decreased labor is attractive, but these entities may be unwilling to sacrifice determinism in the control systems in exchange for the benefit of decreased labor. By retaining a deterministic system, human control or override may be asserted in the event of an improper operation of the control system. Examples of proposed applications of autonomous systems include, but are not necessarily limited to, unmanned aircraft, space exploration including autonomous assembly in space, unmanned rovers, and autonomous rendezvous and docking of a vehicle, and the like. In the future, these autonomous systems may undergo certification by the National Aeronautics and Space Administration (NASA), one or more military branches, the FAA, and other government entities. Non-deterministic systems or systems operating non-deterministic algorithms in human environments (e.g., in the presence of one or more humans) currently lack certification by such entities.

Accordingly, it is desirable to provide a method for controlling an autonomous system that complies with regulations typically associated with deterministic systems. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

Systems and methods are provided for controlling one or more actuators to perform a mission in compliance with at least one regulation and at least one standard. In an exemplary embodiment, a system for controlling one or more actuators is provided comprising a first processor configured to transmit a command to operate at least one of the one or more actuators, a second processor having an input coupled to the first processor and having an output, and a third processor having an input coupled to the output of the second processor and having an output configured to couple to the one or more actuators. The second processor is configured to transmit a first signal based on the command, and the first signal indicates a compliant command. The third processor is configured to transmit a second signal based on the first signal, and the second signal indicates a safe command.

In another exemplary embodiment, a controller for operating one or more actuators is provided comprising a router configured to selectively direct one or more signals among a plurality of processing partitions, a first processing partition of the plurality of processing partitions configured to communicate with the router and further configured to produce a first signal indicating a command, a second processing partition of the plurality of processing partitions configured to communicate with the router and further configured to produce a second signal when the first signal satisfies a set of regulations, a third processing partition of the plurality of processing partitions configured to communicate with the router and further configured to transmit a third signal when the second signal satisfies a set of standards, and a fourth processing partition of the plurality of processing partitions having an input configured to communicate with the router and an output coupled to the one or more actuators. The fourth processing partition is configured to transmit the command upon receipt of the third signal.

In another exemplary embodiment, a method for controlling one or more actuators to perform a mission is provided comprising the steps of producing a first signal indicating a command while performing at least a portion of the mission, producing a second signal indicating a compliant command based on the first signal when the command complies with at least one predetermined regulation, and transmitting the first signal to the one or more actuators when the second signal satisfies at least one predetermined standard indicating a safe command.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

In a more basic embodiment, the present invention is a control system architecture where lower-level protection algorithms command priority over higher-level commands. In an exemplary embodiment, a control system comprises a first layer for individually running mission and non-critical programs and producing commands during execution of these programs, a second layer for validating the commands generated from the first layer to meet any applicable regulations, and a third layer for validating regulation-compliant commands to human-rated standards. The mission layer includes non-deterministic algorithms. Any command that does not comply with the applicable regulations is subsumed or suppressed. Additionally, any regulation-compliant commands that do not meet the human-rated standards are subsumed or suppressed.

Figure 1:
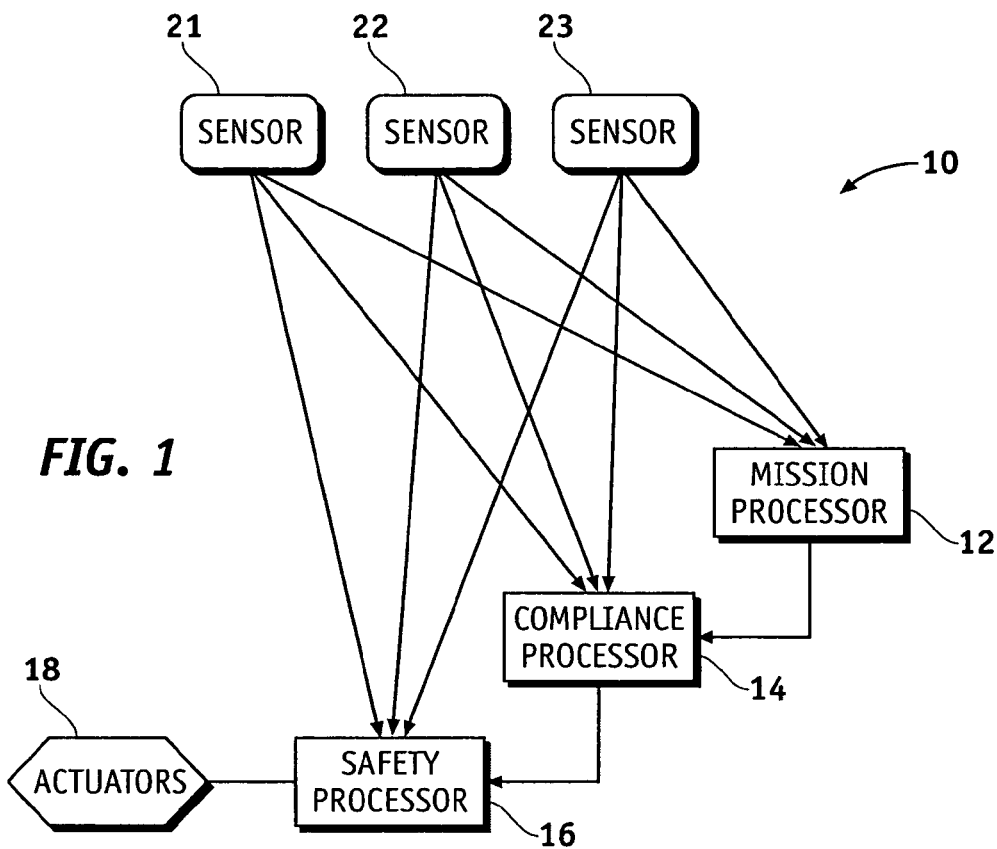
FIG. 1 is a block diagram of a control system in accordance with an exemplary embodiment of the present invention.

Referring now to the drawings, FIG. 1 is a block diagram of a control system 10 in accordance with an exemplary embodiment of the present invention. The control system 10 comprises a first processor 12, or mission processor, configured to execute one or more mission algorithms and produce a command based on a particular mission algorithm, a second processor 14 having an input coupled to the first processor 12 and configured to execute one or more algorithms based on at least one predetermined regulation (e.g., FAA regulation, military specification, and the like), a third processor 16 having an input coupled to an output of the second processor 14 and configured to execute one or more algorithms based on at least one predetermined standard (e.g., human-rated standards, safety standards, and the like), and one or more actuators 18 coupled to an output of the third processor 16 to receive a command from the third processor 16. In this exemplary embodiment, the three (3) layers of the control system 10 architecture are separated out into the first, second, and third processors, 12, 14, and 16, respectively. The third processor 16 transmits the command to the actuator 18 when the command complies with the predetermined regulations and satisfies the predetermined standards as determined by the second and third processors 14 and 16, respectively. Although the control system 10 is described as controlling specific actuators 18, the control system 10 may be applied to any apparatus or system configured to perform a desired action or task. Additionally, the mission algorithms may range in complexity, such as a single action, a series of tasks, or the accomplishment of a mission goal through multiple actions and/or tasks.

Each of the processors 12, 14, 16 may additionally be coupled to one or more sensors or input devices 21, 22, and 23. Each of the sensors 21, 22, 23 provides an input signal that is received by each processor 12, 14, 16 and may be used during the execution of the respective algorithm. For example, the first processor 12 may be coupled to the sensors 21, 22, and 23 and process at least one of the input signals from the sensors 21, 22, and 23 during the execution of a mission algorithm, the second processor 14 may be coupled to the sensors 21, 22, and 23 and process at least one of the input signals from the sensors 21, 22, and 23 during the execution of an algorithm based on the regulations, and the third processor 16 may be coupled to the sensors 21, 22, and 23 and process at least one of the input signals from the sensors 21, 22, and 23 during execution of an algorithm based on the standards. Although three (3) sensors are described to indicate a level of redundancy, the number and type of sensors 21, 22, 23 may vary for each of the processors 12, 14, and 16 and may vary for the particular mission. For example, the first processor 12 may use data from one or more of the sensors 21, 22, 23 to create a command, while the second and third processors 14 and 16 may use the same or different sensors to perform their respective functions.

Based on the mission or task of the actuator, the first processor 12 originates commands that implement such mission or task. The first processor 12 includes different mission algorithms, selects the corresponding mission algorithm based on the input signals (e.g., from the sensors 21, 22, and 23), and produces a first signal indicating the command based on the type of actuator 18 to be controlled by the control system 10 during execution of the mission algorithm. The mission algorithm may result from a variety of sources including, but not necessarily limited to, real-time commands from human operators, planned and scheduled mission tasks, real-time response to environmental conditions while achieving mission goals, and the like. The second processor 14 processes the first signal supplied from the first processor 12 via the algorithms based on the predetermined regulations to determine if the command complies with applicable regulations. Typically, the actuator 18 operates within a space that is governed by the predetermined regulations. For example, an aircraft is governed by FAA regulations. The applicable regulations considered during the execution of the algorithms by the second processor 14 vary based on the type of actuator 18 and may include predefined governmental or industry regulations and other additional regulations (e.g., customer specified requirements or performance requirements). For example, a command to fly a border surveillance aircraft autonomously may be regulated to maintain a minimum altitude and respect international borders. In this example, one or more of the sensors 21, 22, and 23 detect various flight information such as altitude, global position, and the like.

When the second processor 14 determines that the command, as indicated by the first signal from the first processor 12, complies with the regulations (e.g., indicating a compliant command), the second processor 14 transmits a second signal to the third processor 16. The third processor 16 processes the second signal via the algorithms based on the predetermined standards to determine if the command satisfies such standards. In an exemplary embodiment, the predetermined standards are selected based on preventing contact of the actuator 18 with predefined elements of the space occupied by the actuator 18 (e.g., humans, human-occupied structures, and the like) and thus improve safety. For example, the third processor 16 controls all motion of the actuator 18 to prevent contact or undesired contact of the actuator 18 with a predefined element (e.g., a human). In this example, the sensors 21, 22, and 23 sense the proximity of predefined element to the actuator 18 and may measure the forces involved when the actuator 18 contacts the predefined element. The third processor 16 is additionally configured to determine the path of any motion of the actuator 18 and predict the potential contact of the actuator 18 with the human. The algorithms executed by the third processor 16 include logic rules to preclude the device from exerting forces than exceed predetermined levels (e.g., to prevent injury) or altogether avoid contact. When the third processor 16 determines that the command satisfies the predetermined standards, the third processor 16 transmits the command, produced during execution of the mission algorithm, to the actuator 18.

In this exemplary embodiment, the processors 12, 14, 16 are cascaded with the commands produced by the mission algorithms running in the first processor 12 and flowing to the second processor 14 running the compliance algorithms. Any commands that meet the applicable compliance criteria flow to the third processor 16 running the safety algorithms. In this exemplary embodiment, the third processor 16 has access to the actuator 18 and transmits commands thereto when the commands meet both the predetermined regulations and the predetermined standards.

Figure 2:
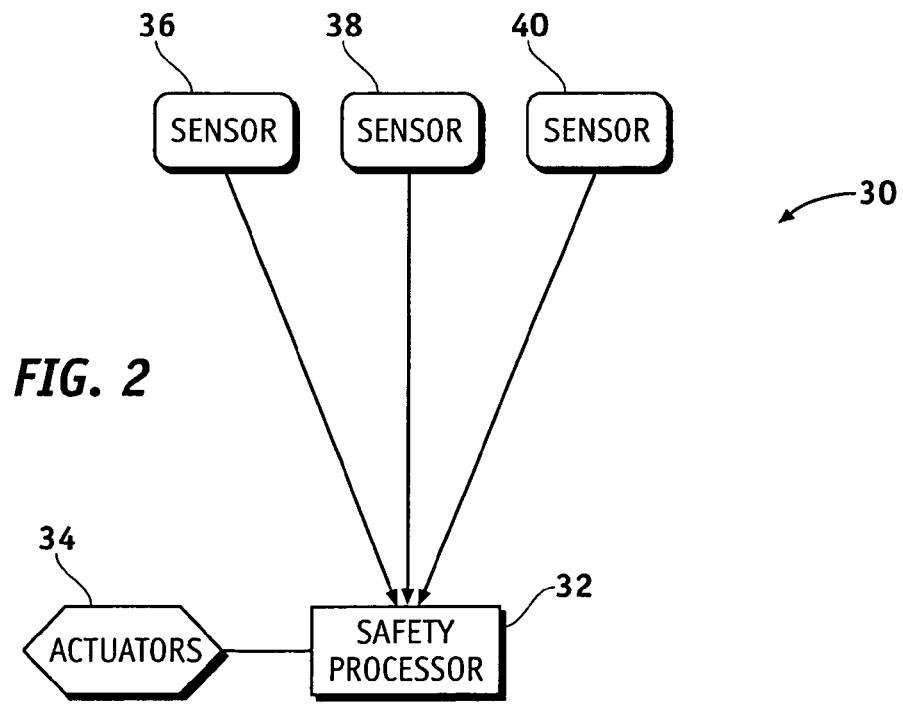
FIG. 2 is a block diagram of a control system in accordance with another exemplary embodiment of the present invention.
Figure 3:
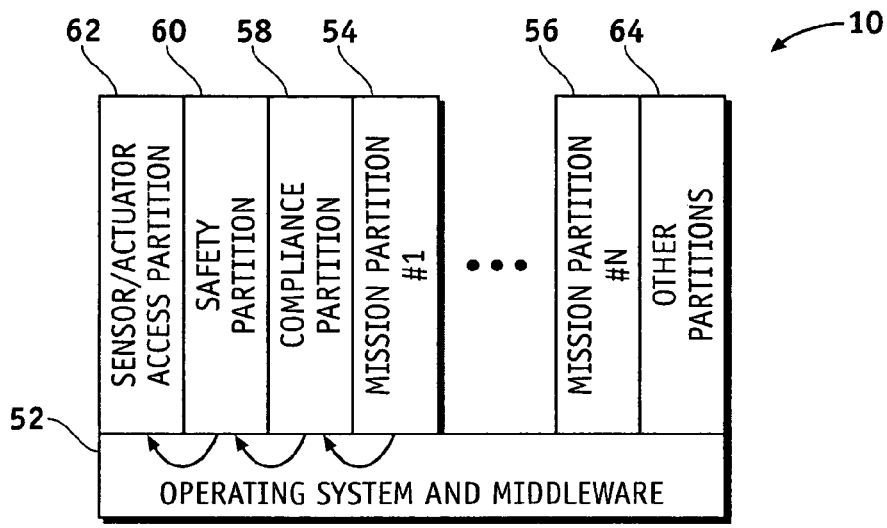
FIG. 3 is a block diagram of time and space processing partitions of the processor shown in FIG. 2.

FIG. 2 is a block diagram of a control system 30 in accordance with another exemplary embodiment of the present invention, and FIG. 3 is a block diagram of time and space processing partitions of the processor shown in FIG. 2. The control system 30 comprises a processor 32, one or more actuators 34 coupled to an output of the processor 32, and one or more sensors 36, 38, and 40 coupled to an input of the processor 32. In this exemplary embodiment, the three (3) layers of the control system architecture are implemented within a single processor 32. The three (3) layers may also be implemented with duplicate processors having redundant processing. Using a combination of hardware, software, and operational tools of the processor 32, the processor 32 provides a single high-throughput computational platform that may be partitioned into multiple virtual computers. For example, partitioning occurs in four (4) domains of the processor 32: memory space, computation time, input/output (I/O) access, and backplane access. Each virtual computer provides a dedicated resource, referred to as a partition, to the associated software application.

In this exemplary embodiment, the processor 32 comprises an operating system and middleware 52, one or more partitions 54, 56 (e.g., mission partition 1, . . . , mission partition n) communicating with the operating system 52 and configured to operate mission algorithms, a partition 58 communicating with the operating system 52 and configured to operate algorithms based on the predetermined regulations (e.g., compliance partition), a partition 60 configured to operate algorithms based on the predetermined standards (e.g., safety partition), and a partition 62 communicating with the operating system and having an input coupled to the sensors 36, 38, 40 and an output coupled to the actuator(s) 34. The processor 32 may additionally include other partitions 64 that process a variety of tasks. For example, an additional partition may be included between the mission partitions 54, 56 and the compliance partition 58 for user commands. In this example, an emergency stop capability may be added using an additional partition.

Movement of data from the sensors 36, 38, and 40 to the processor 32 and from the processor 32 to the actuator 34 is controlled by the operating system 52. Additionally, data movement between the partitions 54, 56, 58, 60, and 62 is also controlled by a routing function of the operating system 52 (e.g., a routing function hosted in the middleware). Commands produced from the mission algorithms that comply with the predetermined regulations and the predetermined standards (e.g., commands that comply with regulation and safety requirements) are relayed to the actuator 34 (e.g., via the partition 62).

By partitioning the processor 32 and controlling the movement of data with the operating system 52, contamination of another partition's code, I/O, or data storage areas is minimized. Additionally, each partition 54, 56, 58, 60, and 62 is prevented from consuming shared processor resources to the exclusion of any other partition and consuming I/O resources to the exclusion of any other partition. Furthermore, the probability of a hardware or software failure unique to a particular partition that adversely affects any other partition is minimized or altogether prevented by the partitioning and controlled movement of data with the operating system 52. Using a single processor 32 reduces the number of computation elements and minimizes or eliminates duplicate sensor/access paths, such as the sensor paths and the actuator paths shown in FIG. 1.

Figure 4:
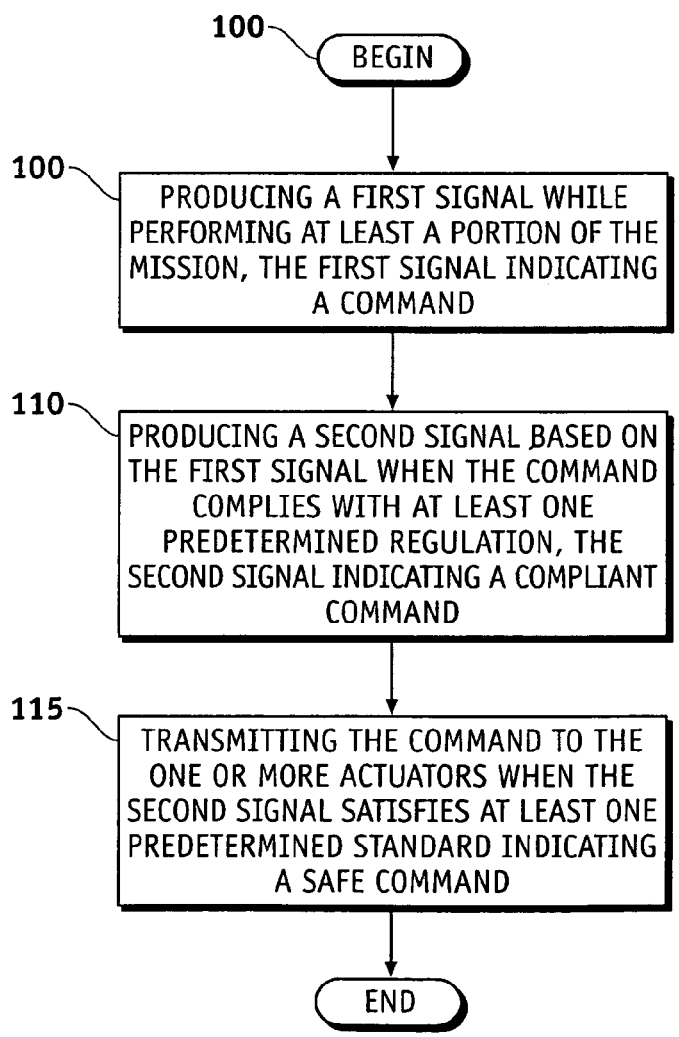
FIG. 4 is a flow diagram of a method for controlling one or more actuators in accordance with an exemplary embodiment of the present invention.

FIG. 4 is a flow diagram of a method 100 for controlling one or more actuators in accordance with an exemplary embodiment of the present invention. A first signal is produced while performing at least a portion of a mission at step 105. The first signal represents a command. A mission algorithm may be selected based on at least one sensor input to perform the mission. A second signal based on the first signal is produced when the command complies with at least one predetermined regulation at step 110. The second signal represents a compliant command. A compliance algorithm may be run or operated to compare the first signal with the predetermined regulation. The command is transmitted to the actuators when the second signal satisfies at least one predetermined standard indicating a safe command at step 115. A safety algorithm may be run or operated to compare the second signal with the predetermined standard.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for controlling one or more actuators, the system comprising:
   a first processor configured to transmit a mission command to operate at least one of the one or more actuators, said mission command being associated with a motion of the one or more actuators;
   a second processor having an input coupled to said first processor and having an output, said second processor configured to transmit a first signal based on said motion of the one or more actuators associated with said mission command, said first signal indicating a compliant command if said motion of the one or more actuators associated with said mission command complies with at least one predetermined industry or government regulation, wherein said second processor comprises a first set of predefined instructions to determine said compliant command based on said motion of the one or more actuators associated with said mission command and said at least one predetermined industry or government regulation; and
   a third processor having an input coupled to said output of said second processor and having an output configured to couple to the one or more actuators, said third processor configured to transmit a second signal based on said first signal, said second signal indicating a safe command if said first signal indicates that the motion of the one or more actuators complies with at least one predetermined safety standard, wherein said third processor comprises a second set of predefined instructions to determine said safe command based on said first signal and said at least one predetermined safety standard.

2. A system according to claim 1, wherein said first processor comprises a set of predefined instructions to execute at least one mission and transmit said mission command when executing said at least one mission.

3. A system according to claim 2, wherein said first processor is further configured to:
   couple to at least one sensor, at least one of said at least one sensor configured to produce an input signal; and
   execute said at least one mission based on said input signal.

4. A system according to claim 1, wherein said first set of predefined instructions suppresses said mission command when said motion of the one or more actuators associated with said mission command is non-compliant with said at least one predetermined industry or government regulation.

5. A system according to claim 1, wherein said second processor is further configured to couple to at least one sensor, at least one of said at least one sensor configured to produce an input signal; and wherein said first set of predefined instructions is configured to determine said compliant command based on said input signal.

6. A system according to claim 1, wherein said second set of predefined instructions suppresses said mission command when said first signal indicates that said motion of the one or more actuators associated with mission command exceeds said at least one predetermined safety standard.

7. A system according to claim 1, wherein said third processor is further configured to couple to at least one sensor, at least one of said at least one sensor configured to produce an input signal; and wherein said second set of predefined instructions is configured to determine said safe command based on said input signal.

8. A system according to claim 1, wherein the at least one predetermined industry or government regulation includes at least one of a) airspace regulations or b) altitude regulations.

9. A system according to claim 1, wherein the at least one predetermined safety standard includes at least one of a) obstacle clearance or b) force limits.

10. A controller for operating one or more actuators, the controller comprising:
   a router configured to selectively direct one or more signals among a plurality of processing partitions;
   a first processing partition of said plurality of processing partitions configured to communicate with said router and further configured to produce a first signal indicating a mission command associated with a motion of the one or more actuators;
   a second processing partition of said plurality of processing partitions configured to communicate with said router and further configured to produce a second signal when said motion of the one or more actuators satisfies a set of industry or government regulations;
   a third processing partition of said plurality of processing partitions configured to communicate with said router and further configured to produce a third signal when said motion of the one or more actuators satisfies a set of safety standards; and
   a fourth processing partition having a first input configured to communicate with said router and an output coupled to the one or more actuators, said fourth processing partition configured to transmit said command upon receipt of said third signal.

11. A controller according to claim 6, wherein said first processing partition is further configured to operate at least one mission algorithm to produce said mission command.

12. A controller according to claim 7, wherein said fourth processing partition has a second input configured to couple to at least one sensor, said at least one sensor producing an input signal, and wherein said at least one mission algorithm produces said mission command based on said input signal.

13. A controller according to claim 6, wherein said second processing partition is further configured to operate at least one compliance algorithm on said first signal to produce said second signal, said at least one compliance algorithm based on said set of industry or government regulations.

14. A controller according to claim 13, wherein said second processing partition is further configured to suppress said second signal when said motion of the one or more actuators is non-compliant based on said at least one compliance algorithm.

15. A controller according to claim 10, wherein said third processing partition is further configured to operate at least one safety algorithm on said second signal to transmit said command, said at least one safety algorithm based on said set of safety standards.

16. A controller according to claim 15, wherein each of said at least one safety algorithm has at least one standard, and wherein said third processing partition is further configured to suppress said command when said motion of the one or more actuators does not satisfy said set of safety standards based on said at least one safety algorithm.

17. A method for controlling one or more actuators to perform a mission, the method comprising the steps of:
   producing a first signal while performing at least a portion of the mission, the first signal indicating a mission command associated with a motion of the one or more actuators;
   producing a second signal based on the first signal when the motion of the one or more actuators complies with at least one predetermined government or industry regulation, the second signal indicating a compliant command; and
   transmitting the command to the one or more actuators when the motion of the one or more actuators satisfies at least one predetermined standard indicating a safe command.

18. A method according to claim 17, wherein said step of producing the first signal comprises selecting a mission algorithm based on at least one sensor input, the mission algorithm based on the mission.

19. A method according to claim 17, wherein said step of producing the second signal comprises operating a compliance algorithm to compare the motion of the one or more actuators with the at least one predetermined government or industry regulation.

20. A method according to claim 17, wherein said step of transmitting the command comprises operating a safety algorithm to compare the motion of the one or more actuators with the at least one predetermined standard.

* * * * *